United States Patent Office 3,342,869
Patented Sept. 19, 1967

3,342,869
NOVEL OXIDATION CATALYST COMPOSITIONS AND PROCESSES
Roger P. Cahoy, Merriam, and Donald M. Coyne, Prairie Village, Kans., assignors, by mesne assignments, to Gulf Oil Corporation, Pittsburgh, Pa., a corporation of Pennsylvania
No Drawing. Filed Dec. 26, 1962, Ser. No. 247,306
3 Claims. (Cl. 260—604)

This invention relates to processes of providing unsaturated carbonylic compounds. More particularly, it relates to processes of providing unsaturated carbonylic compounds by the oxidation of olefins.

Compounds produced by the processes of this invention have well-known utilities. For example, aldehydes such as acrolein and methacrolein provided by processes of this invention are intermediates in producing a number of other useful compounds. It is known in illustration that acrolein can be employed as an intermediate in the production of methionine. It is further useful in the preparation of compounds such as the resin intermediate hexanetriol, as a herbicide, and in a number of polymer applications in view of its alpha-unsaturation. Additionally, unsaturated aldehydes produced by the processes of this invention, such as acrolein and methacrolein, can be converted by known processes to their respective highly useful alkyl acrylic ester compounds. Also, those unsaturated ketones, which are oxidation products of certain of the higher olefins, have utilities as solvents, as polymerization monomers, and the like.

By this invention are provided novel processes of producing unsaturated carbonylic compounds by the oxidation of an olefin having three to about ten carbon atoms by contacting a gaseous stream of oxygen and said olefin at an elevated oxidizing temperature with copper-sulfur oxygen oxidation catalyst complexes, also provided hereby, represented by the following empirical formula:

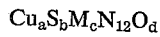

wherein M represents a silicon or a phosphorus atom; N represents a molybdenum, vanadium, or a tungsten atom; and the letters $a$, $b$, $c$, and $d$ represent the amounts of the respective atoms as follows: "$a$" represents a number in the range from about one to about 20 (preferably from about five to about 15); "$b$" represents a number in the range from about 0.01 to about 10 (preferably from about 0.05 to about five); "$c$" represents a number in the range from zero to about five (preferably from about 0.5 to about two, or up to about two); and "$d$" is a number in the range from about 30 to about 100 (preferably from about 40 to about 70). A further preferred catalyst has the empirical formula of about the following:

The metals of the catalyst complex are believed to be largely if not essentially totally in the form of their respective oxides. This is indicated by X-ray diffraction patterns and other data. However, it is not meant to be bound by such theory or belief.

The oxygen values recited are determined by calculation on basis of the oxygen content of oxides of the constituent metal atoms, assuming they are fully present in the complexes as their respective oxides. The assumed oxides as $CuO$, $P_2O_5$, $SiO_2$, $SO_3$, $MoO_3$, $WO_3$ and $V_2O_5$. A portion of additional metal atoms can be incorporated at times into the above defined catalyst complexes without substantially hindering the oxidative processes.

Representative catalysts can be prepared as described hereinafter in greater detail, by starting with a soluble copper salt (e.g., copper nitrate), a source of M and N atoms of the catalyst complex (e.g., phosphomolybdic acid), and a source of sulfur such as sulfuric acid and ammonium sulfate.

It is preferred in the processes of this invention to employ either propylene or isobutylene, especially the latter. The oxidation of these olefins provide the aldehydes, acrolein and methacrolein, respectively. However, other olefins having four or more carbon atoms, including, e.g., both alpha-olefins and beta-olefins can be oxidized to other unsaturated carbonylic compounds, such as unsaturated ketones. Ethyl vinyl ketone is an oxidation product of pentene-1 and pentene-2, whereas the oxidation of alpha- or beta-butylene provides methyl vinyl ketone. Furthermore, cyclopentenone-2 and methyl-isopropenyl ketone are oxidization products of cyclopentene and 2-methyl-butene-2, respectively.

Illustrative olefin compounds in addition to propylene and isobutylene, which are utilizable in the processes, include the following in illustration: propylene, butene-1, butene-2, isobutylene, pentene-1, pentene-2, 3-methyl-butene-1, 2-methyl-butene-2, hexene-1, hexene-2, 4-methyl-pentene-1, 3,3-dimethyl-butene-1, 4-methyl-pentene-2, octene-1, cyclopentene, cyclohexene, 3-methyl-cyclohexene, etc.

The catalyst employed in this invention can be prepared following conventional procedures of catalyst preparation. For example, a general procedure found suitable in providing presently preferred catalyst complexes of this invention, is as follows: Both the agent or agents selected for use in the catalyst preparation to provide the M and N atoms (such as phosphomolybdic acid), a water-soluble copper compound such as copper nitrate, and a suitable sulfur compound such as sulfuric acid are dissolved in a minimum volume of water. In the preparation, the minimum aqueous mixture can be added, and generally preferably is added, to a suitable support. For example, the aqueous mixture can be added to a heated silicon carbide aggregate in such a manner that the reagents will coat or form a film on the aggregate particles. In forming the coated aggregates, it is desirable that the aqueous mixture of the catalyst source atoms be added to the heated aggregates at the same rate at which it is removed. The support suitably has about one to about ten percent by weight of the catalyst complex, with usually three to about eight percent desirable. The aggregate catalyst particles are suitably dried and fired in the usual manner as by heating to about 1000° F. Other alternative procedures can be employed to provide suitable catalyst preparations and will be apparent to those skilled in the art from the disclosures made herein.

Various suitable agents can be employed as sources of the atom constituents of the catalyst complexes of this invention. Since present evidence indicates the final activated catalysts, as used in the hereby provided processes, contain the constituent metal atoms as a complex of their respective oxides, presumably the respective oxides could theoretically be employed as the starting materials. However, whether or not the appropriate combination of the oxides of copper, silicon, molybdenum, sulfur, etc. could in fact be employed to provide a catalyst of this convention, is not presently completely established.

In respect to copper, as mentioned above, water-soluble salts of copper which are capable of disintegrating to the oxide of copper on firing the catalyst but which do not leave an interfering residue have been found suitable as copper atom sources. Copper nitrate is a presently preferred salt. Source agents for the M and N atoms include such agents as phosphomolybdic acid, molybdic acid, ammonium molybdate, phosphoric acid, polyphosphoric acid, silicomolybdic acid, phosphotungstic acid, tungstic acid, silicotungstic acid, phosphovanadic acid, silicovanadic acid, ammonium vanadate, and other suitable sources having adequate water-solubility (the names of the acids are used in the sense of their usual meanings to the chemical art). For a source of sulfur, any sulfur compound can be used which has a suitable solubility and which is or can be converted to its oxide on firing but again which does not on firing leave in the final catalyst complex a substantially interfering residue. Suitable sulfur source agents include sulfuric acid, ammonium sulfate, copper sulfate, and the like.

In respect to catalyst supports, silicon carbide is presently preferable but other conventional supports which are inert in the processes of this invention can be employed. Such materials included silica gel, diatomaceous earth, certain clays, Alundum, alumina-silica, porcelain, alumina, titania, and the like. The support can vary widely in surface area, e.g., the support can have a high or low surface area. By "low surface area" is meant less than about five square meters of surface per gram of support, whereas by "high surface area" is meant more than about five square meters of surface per gram of support.

Although it is preferred to employ a supported catalyst, it is within the scope of this invention to include the hereinabove named catalyst compositions in an unsupported form insofar as they catalyze the oxidation of olefins to desired carbonylic compounds.

The catalyst preparations, particularly the supported catalysts, are subdivided if desirable as by crushing or grinding to provide a suitable particle size for the processes. It has been found that a particle size of the catalyst is preferably of a size largely falling in a mesh range of about four to about 16 in the U.S. Sieve Series when a fixed bed technique is employed.

By employing processes of this invention, excellent conversions of the olefin are realized and, likewise, high yields of the desired carbonylic compound or compounds are obtained. By "yield" of the carbonylic compound is meant, in the usual sense, the percentage of the converted olefin obtained as the desired carbonylic compound. In illustration, if a 50 percent of isobutylene feed is converted or consumed in a reaction and of the 50 percent converted isobutylene, 60 percent is in the form of the desired methacrolein, the yield then is 60 percent.

The processes of this invention are preferably conducted in a continuous manner by passing the gaseous feed stream through an amount of the supported catalyst in a fixed bed. In such an arrangement, conventional oxidation apparatuses enabling a continuous procedure can be employed. A fluidized bed of catalyst can be used also. Even though the continuous procedures are preferred, batch procedures and the like which will provide the herein described oxidations are included within the scope of this invention.

The reaction temperature employed may vary considerably. The particular reaction temperature used depends upon the catalyst used, the olefin being oxidized, the flow rate of the gas feed, the contact time of the olefin with the catalysts, and other factors. In general, when operating at pressures near atmospheric, temperatures in the range of about 350° to about 650° C. are effective. A preferred temperature range in oxidation of isobutylene and propylene has been found to be about 400° to about 600° C. The contact time of the olefin can vary considerably. Broadly speaking, it can vary from about 0.1 up to about 20 seconds. The optimum contact time must be individually determined depending upon the ratio of the gas feed, reaction temperature, the olefin, the particular catalyst employed, and like factors. Generally, a 0.05- to about a five-second contact time is sufficient and is preferred.

A molar ratio of oxygen to olefin between about 5:1 to 0.5:1 (preferably ordinarily about 1:1) generally gives the most satisfactory results. Illustratively, in methacrolein preparation, a preferred ratio of oxygen to olefin is about 1:1 on a volume basis. The oxygen used in the process may be derived from any suitable source including, of course, oxygen gas. However, air is a satisfactory source and is preferred in view of economic considerations.

The addition of water to the olefin feed has been found to be highly desired inasmuch as an improved conversion and yield of the desired product is usually realized. Generally, a ratio of olefin to water in the reaction mixture of 1:0.5 to 1:10 (by volume) will give satisfactory results. For example, a ratio of 1:1 to 1:5 has been found to be optimum when converting isobutylene to methacrolein. The water, of course, will be in the vapor phase during the reaction. Therefore, an olefin feed having a ratio of olefin:oxygen:water of 1:0.5:0.5 to 1:5:10 has been found suitable.

Inert diluents may be present in the feed without interfering with the oxidation. A much desired advantage of the processes of this invention is the ability to oxidize, for example, isobutylene, in the presence of other hydrocarbons, such as isobutane. This is an important quality since utilizable petroleum gas streams of isobutylene, for example, commonly contain a high percentage of saturated and other hydrocarbons.

In large scale operation, it is preferred to carry out the process in a continuous manner. In commercial operations unreacted olefin often is recovered and is recycled. The catalyst will require regeneration or replacement from time to time.

The unsaturated carbonyl products can be suitably isolated from the reaction stream by any appropriate means. For example, the discharge stream can be passed through "scrubbers" containing water or other appropriate solvents. The desired carbonylic compound can be recovered from the scrubber solution by extraction, by distillation, or by other conventional means. The efficiency of the scrubbing operation may be improved when water is employed as the scrubbing agent by adding a suitable wetting agent to the water. It is desired to include suitable inhibitors as is customary to prevent polymerization of the unsaturated oxidation products.

The following illustrative examples are presented in illustration of the processes and catalyst compositions of this invention but not in limitation thereof.

*Example 1*

A hot mixture of 13.0 g. of $Cu(NO_3)_2 \cdot 3H_2O$, 1.59 g. of ammonium sulfate and 14.0 g. of phosphomolybdic acid in 80 ml. of water is added with stirring to 214 g. of a porous silicon carbide aggregate having a 4 to 8 mesh size. The addition is carried on in such a manner that the evaporation of the water of the mixture is very rapid. The resulting dry particles of catalyst are fired in an oven for two hours at 1000° F. The dried catalyst is obtained in a yield of 230 g. and has about 7 percent by weight of the catalyst complex of the following formula: $Cu_9S_2PMo_{12}O_{51.5}$ (empirical formulas given in examples determined by calculation).

The catalyst preparation can be repeated employing a high area catalyst support, such as a high area silicon dioxide support.

A portion of the catalyst (200 ml.) is placed into a 400-ml. oxidation reactor. A feed stream vapor of isobutylene is employed having the following composition by volume: isobutylene — 13.6%; air — 74.0%; and water—12.4%. The reaction is conducted at approximately atmospheric pressure employing a temperature of 487° C. The contact time of the monomer feed with the catalyst bed is an average of 2.3 seconds. The product is recovered in the customary manner employing water scrubbers and is analyzed by the Orsat and GLC methods (as used herein, "GLC" means "gas liquid chromatography"). The conversion of isobutylene is 43 percent and the yield of methacrolein is 63 percent.

The process is repeated employing a 442° C. reaction temperature, an average contact time of 2.0 seconds, and a reaction feed having a ratio by volume (isobutylene:air:H₂O) of 13.7:75.6:10.7 to provide a 25 percent conversion of isobutylene and a yield of 57 percent methacrolein.

The process is again repeated employing a 534° C. reaction temperature, an average contact time of 1.8 seconds, and a reaction feed having a ratio by volume (isobutylene:air:H₂O) of 13.7:75.6:10.7 to provide a 44 percent conversion of isobutylene and a 53 percent yield of methacrolein.

Example 2

A copper-phosphorus-molybdenum-sulfur catalyst complex is prepared by the procedure of Example 1 employing the same starting silicon carbide aggregate support and the following reactants: 13.0 g. of $Cu(NO_3)_2 \cdot 3H_2O$, 14.0 g. of phosphomolybdic acid, and 1.84 g. of sulfuric acid. The empirical formula of the catalyst complex provided is $Cu_9S_{3.2}PMo_{12}O_{53.9}$. The dried supported catalyst has 7.4 percent by weight of the catalyst complex.

The following results are obtained with the provided catalyst in repeating the process of Example 1 and the indicated conditions: (1) 461° C., 2.3 seconds contact time, and a ratio by volume (isobutylene:air:H₂O) of 13.6:74.0:12.4 to provide a 40 percent conversion of isobutylene and a 67 percent yield of methacrolein; (2) 488° C., 2.3 seconds contact time, and a ratio of 13.6:74.0:12.4 to provide an isobutylene conversion of 41 percent and a methacrolein yield of 68 percent; (3) 466° C., 3.0 seconds contact time, and a ratio of 13.1:71.2:15.7 to provide an isobutylene conversion of 40 percent and a methacrolein yield of 66 percent.

Example 3

Other catalyst complexes are provided by following essentially the catalyst preparation procedure of Example 1, and the following reaction mixtures and 330 g. of the catalyst support:

(1) A copper-sulfur-silicon-molybdenum-oxygen catalyst complex is provided by using the following aqueous mixture: 19.3 g. of silicomolybdic acid, 5 ml. of nitric acid, 21.7 g. of $Cu(NO_3)_2 \cdot 3H_2O$, 2.1 g. of 95% sulfuric acid and 75 ml. of H₂O. Empirical formula:

$$Cu_9S_2SiMo_{12}O_{51}$$

(2) A copper-sulfur-phosphorus-tungsten-oxygen catalyst complex is prepared using the following aqueous mixture: 24.1 g. of phosphotungstic acid, 15.2 g. of $Cu(NO_3)_2 \cdot 3H_2O$, 1.44 g. of 95% $H_2SO_4$ and 65 ml. of water. Empirical formula:

$$Cu_9S_2PW_{14}O_{51.5}$$

(3) A copper-sulfur-silicon-tungsten-oxygen catalyst complex is prepared by using the following aqueous mixture: 23.9 g. of silicotungstic acid, 15.2 g. of $$Cu(NO_3)_2 \cdot 3H_2O$$

1.44 g. of 95% sulfuric acid and 75 ml. of water. Empirical formula:

$$Cu_9S_2SiW_{12}O_{51}$$

(4) A copper-sulfur-phosphorus-vanadium-oxygen catalyst complex is prepared by using the following aqueous mixture: 20.5 g. of ammonium phosphovanadate (prepared by the process described by A. Rosenheim and M. Pieck, Z. Anorg. Allgem. Chem. 98, 223—1916), 28.3 g. of $Cu(NO_3)_2 \cdot 3H_2O$, 2.68 g. of 95% sulfuric acid and 50 ml. of water. Empirical formula:

$$Cu_9S_2PV_{12}O_{45.5}$$

(5) A copper-sulfur-molybdenum-oxygen catalyst complex is prepared by using the following aqueous mixture: 20.4 g. of molybdic acid (85 percent), 21.7 g. of $Cu(NO_3)_2 \cdot 3H_2O$, 2.1 g. of sulfuric acid (95 percent) and 60 ml. of water. Empirical formula:

$$Cu_3S_2Mo_{12}O_{49}$$

(6) A copper-sulfur-tungsten-oxygen catalyst complex is prepared as follows: tungstic acid (18 g.) is dissolved in 75 ml. of ammonium hydroxide. The solution is added to 255 g. of commercially available aluminum oxide having a low surface area sold by Carborundum Company under designation "Grade AMC". The volatiles are evaporated and the particles are coated by stirring. The partially coated carrier is heated at 500° F. for one hour. After cooling, the alumina-tungstic acid particles are treated with a solution containing 13 g. of $$Cu(NO_3)_2 \cdot 3H_2O$$

2.1 g. of sulfuric acid (95 percent) and 65 ml. of water. After removing the volatiles under low heat, the catalyst is heat treated for two hours at 1000° F. and cooled. Empirical formula:

$$Cu_9S_2W_{12}O_{49}$$

(7) SiO₂ supported catalyst is made using: 2.1 g. of sulfuric acid (95 percent), 22.9 g. of phosphomolybdic acid and 21.7 g. of $Cu(NO_3)_2 \cdot 3H_2O$ are dissolved in 450 g. of 34% silica sol with heating and rapid stirring. The sol-catalyst mixture is heated (80° C.) and stirred until a permanent gel results. The catalyst gel is predried at 100° C. for eight hours. The catalyst is then heat treated for two hours at 1000° F. The catalyst particles are crushed and the 4–16 mesh material is retained for oxidation. Empirical formula of complex:

$$Cu_9S_2PMo_{12}O_{51.5}$$

These provided catalysts are employed in repeating the processes of Examples 1 and 2.

Other olefins such as propylene, pentene-1, butene-1, and 2-methyl butene-1, can be substituted as the olefin in the above specifically described processes.

What is claimed is:

1. A process for converting isobutylene to methacrolein comprising reacting isobutylene at a temperature within the range of about 400° C. to about 600° C. in the presence of oxygen, steam and a metal oxide composition consisting essentially of oxides of copper, sulfur, phosphorus and molybdenum, said oxides being present in the ratios indicated, by the empirical formula $$Cu_{5-15}S_{0.05-5}P_{0.5-2}Mo_{12}O_{40-70}$$

the oxygen value of said empirical formula being calculated, based on the assumption that the metal oxides are fully present in the metal oxide composition as $CuO$, $SO_3$, $P_2O_5$ and $MoO_3$, said metal oxide composition being on the surface of porous silicon carbide aggregate.

2. A process according to claim 1 in which the metal oxide composition has the empirical formula $$Cu_9S_2PMo_{12}O_{51.5}$$

3. A process according to claim 1 in which the metal oxide composition has the empirical formula $$Cu_9S_{3.2}PMo_{12}O_{53.9}$$

References Cited

UNITED STATES PATENTS

| | | | |
|---|---|---|---|
| 1,955,829 | 4/1934 | Pier et al. | 252—439 X |
| 2,627,527 | 2/1953 | Connolly et al. | 260—604 |

(Other references on following page)

UNITED STATES PATENTS

| | | | |
|---|---|---|---|
| 2,670,380 | 2/1954 | Hadley | 260—604 |
| 2,691,037 | 10/1954 | Bellringer et al. | 252—435 X |
| 2,780,650 | 2/1957 | Robertson et al. | 260—597 |
| 2,807,647 | 9/1957 | Cheney et al. | 260—604 |
| 2,920,049 | 1/1960 | Romanousky et al. | 252—437 |
| 3,009,960 | 11/1961 | Shotts et al. | 260—604 |
| 3,044,966 | 7/1962 | Callohan et al. | 252—437 |
| 3,052,724 | 9/1962 | Marullo et al. | 260—597 |
| 3,102,147 | 8/1963 | Johnson et al. | 260—604 |

FOREIGN PATENTS

| | | |
|---|---|---|
| 605,502 | 6/1961 | Belgium. |
| 839,808 | 6/1960 | Great Britain. |

LEON ZITVER, *Primary Examiner.*

LORRAINE A. WEINBERGER, *Examiner.*

MAURICE A. BRINDISI, R. H. LILES, H. T. CARTER,
*Assistant Examiners.*

UNITED STATES PATENT OFFICE
CERTIFICATE OF CORRECTION

Patent No. 3,342,869                                            September 19, 1967

Roger P. Cahoy et al.

It is hereby certified that error appears in the above numbered patent requiring correction and that the said Letters Patent should read as corrected below.

Column 6, line 10, for "$Cu_3S_2Mo_{12}O_{49}$" read -- $Cu_9S_2Mo_{12}O_{49}$ --.

Signed and sealed this 15th day of October 1968.

(SEAL)
Attest:

Edward M. Fletcher, Jr.                                         EDWARD J. BRENNER
Attesting Officer                                                       Commissioner of Patents